US011227325B1

(12) United States Patent
Baral et al.

(10) Patent No.: US 11,227,325 B1
(45) Date of Patent: Jan. 18, 2022

(54) EVENT-BASED AUTOMATIC TRANSACTION SYSTEM

(71) Applicant: Wells Fargo Bank, N.A., San Francisco, CA (US)

(72) Inventors: Himanshu Baral, Fremont, CA (US); David J. Hiltgen, Fort Hill, CA (US); Christine Rein, San Francisco, CA (US); Laura B. Smith, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 175 days.

(21) Appl. No.: 16/216,875

(22) Filed: Dec. 11, 2018

Related U.S. Application Data

(60) Provisional application No. 62/599,979, filed on Dec. 18, 2017.

(51) Int. Cl.
*G06Q 30/00* (2012.01)
*G06Q 30/06* (2012.01)
*H04W 4/90* (2018.01)
*G06Q 20/40* (2012.01)
*H04W 4/021* (2018.01)
*G06Q 20/32* (2012.01)

(52) U.S. Cl.
CPC ....... *G06Q 30/0637* (2013.01); *G06Q 20/325* (2013.01); *G06Q 20/405* (2013.01); *G06Q 30/0641* (2013.01); *H04W 4/021* (2013.01); *H04W 4/90* (2018.02)

(58) Field of Classification Search
CPC .. G06F 16/9535; G06F 3/04842; G06F 16/29; G06F 16/212; G06F 16/9537; G06Q 50/265; G06Q 50/30; G06Q 50/14; G06Q 10/00; G06Q 30/02; G06Q 50/26; G06Q 30/0637; G06Q 20/325; G06Q 20/405; G06Q 30/0641; G01W 1/00; H04W 4/90; H04W 4/021; G06C 30/02
USPC ....................................................... 705/26, 27
See application file for complete search history.

(56) References Cited

U.S. PATENT DOCUMENTS

| | | | |
|---|---|---|---|
| 7,774,239 B2 | 8/2010 | Prescott | |
| 7,817,982 B1* | 10/2010 | Chu | G08B 27/006 455/404.1 |
| 8,548,911 B2 | 10/2013 | Dent et al. | |
| 8,620,771 B2 | 12/2013 | Pappas et al. | |
| 9,246,610 B2 | 1/2016 | Johnson et al. | |
| 9,609,479 B1* | 3/2017 | Bostick | G06F 16/9537 |

(Continued)

OTHER PUBLICATIONS

Everbridge Launches Intelligent Profiles Solution to Improve Employee Security Business Wire [New York] Nov. 18, 2015; Dialog #1733963909 2pgs. (Year: 2015).*

*Primary Examiner* — Robert M Pond
(74) *Attorney, Agent, or Firm* — Foley & Lardner LLP

(57) ABSTRACT

Systems, apparatuses, and methods of making (initiating and processing) an event-based automatic transaction on behalf of a user including and not limited to, determining an event geolocation impacted by an event and determining that the user is at the event geolocation based on a user device geolocation received from a user device of the user. In response to determining that the user is at the event geolocation, the event-based automatic transaction is automatically initiated and processed to digitally purchase goods or services on behalf of the user.

30 Claims, 10 Drawing Sheets

(56) References Cited

U.S. PATENT DOCUMENTS

| | | | |
|---|---|---|---|
| 2004/0109061 A1* | 6/2004 | Walker | H04N 21/6125 |
| | | | 348/152 |
| 2006/0267783 A1 | 11/2006 | Smith | |
| 2007/0223658 A1* | 9/2007 | Moore | G06Q 10/00 |
| | | | 379/37 |
| 2013/0212014 A1 | 8/2013 | Dent et al. | |
| 2013/0304904 A1* | 11/2013 | Mouline | H04L 43/045 |
| | | | 709/224 |
| 2014/0201037 A1 | 7/2014 | Mallawarachchi et al. | |
| 2014/0245204 A1* | 8/2014 | Battcher | G06F 3/04842 |
| | | | 715/765 |
| 2016/0035007 A1 | 2/2016 | Taylor | |
| 2016/0379327 A1 | 12/2016 | Bhatt et al. | |
| 2017/0148030 A1* | 5/2017 | Fernandez Acuna | |
| | | | G06Q 30/016 |
| 2017/0213464 A1 | 7/2017 | Emadi et al. | |
| 2017/0345112 A1* | 11/2017 | Locke | G06F 16/9535 |
| 2018/0144639 A1* | 5/2018 | Kumar | G05D 1/0088 |
| 2019/0073672 A1* | 3/2019 | Castinado | G06Q 50/01 |

* cited by examiner

List of events
510

- Hurricane
- Flood
- Earthquake
- Storms
- Wild fire
- Terrorist Attack
- Health Emergency
- ⋮

Products including in event based automatic transaction
520

- Water
- Food
- Gas
- Prescription Medication
- Batteries
- Flashlight
- Baby Supplies
- ⋮

EVENT-BASED AUTOMATIC TRANSACTION SYSTEM

CROSS REFERENCE TO RELATED APPLICATION

This application claims priority to U.S. Provisional Patent Application No. 62/599,979 entitled "EVENT-BASED AUTOMATIC TRANSACTION SYSTEM," filed Dec. 18, 2017, and hereby incorporated by reference in its entirety.

BACKGROUND

Changing weather patterns, political unrest, and burden on natural resources by a burgeoning global population have resulted in many disaster events, including natural disasters, terrorist attacks, and health emergencies to name a few. Users of a financial institution (e.g., customers and employees of the financial institution) may find themselves at or close to an event geolocation, which may be associated with a geographical area significantly impacted by the event. The users are often notified of the event or seriousness (e.g., scale of impact) thereof when the event is very close to happening or has already occurred. Most users wait until such an event has occurred before attempting to purchase basic amenities and supplies (e.g., food, water, medicine, batteries, baby supplies, etc.). This creates a huge demand on retailers and other suppliers of such products. As witnessed during recent natural disasters, for example, hurricanes Harvey, Irma, Maria, Katrina, Sandy, the California wildfires, the Louisiana flooding, the Las Vegas shooting, etc., product supplies during such events often dwindle due to high demand, leaving many users unable to obtain products when most needed. Furthermore, many transportation routes may be blocked, preventing the users from traveling to locations where the products can be obtained. The transportation issues can also cause delayed access to the user from first responders. Limited access to the products may further exacerbate the situation, and may result in serious physical harm to the user and/or the family of the user. Furthermore, first responders and deliverers of goods and services may have a difficult time locating the users due to uncertainty of the users' locations during disasters, because the users may be at shelters or safe areas rather than in their own homes or at their places of employment.

SUMMARY

Arrangements described herein relate generally to systems, apparatuses, and methods for initiating and processing an event-based automatic transaction on behalf of a user without user input to initiate and process the event-based automatic transaction, if it is determined that a user geolocation is at or within a proximity of an event geolocation, so as to purchase products on behalf of the user, and to deliver thereto.

In some arrangement, a method of making an event-based automatic transaction on behalf of a user includes receiving, by a financial institution computing system from an external notification system, an event message including information about an event. The financial institution computing system determines from the event message, at least one of a probability of the event occurring and the event has occurred. In response to at least one of the probability of the event occurring being above a predetermined threshold or the event having already occurred, the financial institution computing system determines from the event message, an event geolocation impacted by the event. The financial institution computing system determines a user geolocation of the user. In response to determining that the user geolocation is at the event geolocation, an event-based automatic transaction is initiated without user input on behalf of the user, by the financial institution computing system.

In some arrangements, a financial institution computing system includes a network interface structured to facilitate data communication via a network, and a memory. The financial institution computing system also includes a processing circuit including a processor. The processing circuit is configured to receive, from an external notification system, an event message including information about an event. The processing circuit determines, from the event message, at least one of a probability of the event occurring and the event has occurred. In response to at least one of the probability of the event occurring being above a predetermined threshold and the event having occurred, an event geolocation impacted by the event is determined. A user geolocation of the user is also determined. In response to determining that the user geolocation is at the event geolocation, the processing circuit initiates an event-based automatic transaction without user input on behalf of the user.

In some arrangements, a non-transitory processor-readable medium having processor-readable instructions stored thereon, such that when executed by a processor of a financial institution computing system, cause the financial institution computing system to perform operations. The operations comprise receiving, from an external notification system, an event message including information about an event from the event message, at least one of a probability of the event occurring and the event has occurred is determined. In response to at least one of the probability of event occurring being above a predetermined threshold or the event having occurred, an event geolocation impacted by the event is determined. Furthermore, a user geolocation of the user is determined. In response to the user geolocation being at the event geolocation, an event-based automatic transaction is initiated without user input on behalf of the user.

In some arrangements, a method of making an event-based automatic transaction on behalf of a user comprises sending, from a financial institution computing system to a user device associated with the user, a request message for enrolling in an event-based automatic transaction program before an event has occurred. A request message is received, by the user device. In response to the user enrolling in the event-based automatic transaction program, information about the user is added, by the financial institution computing system to an event transaction database. The financial institution computing system determines whether the event is about to occur. In response to the determining that the event is about to occur, the financial institution computing system determines an event geolocation impacted by the event. A user geolocation of the user is determined by the financial institution computing system. The financial institution computing system determines whether the user geolocation is at the event geolocation. In response to the user geolocation being at the event geolocation and the user having enrolled in the event-based transaction program, the event-based automatic transaction is initiated by the financial institution computing system on behalf of the user without user input.

In some arrangements, a method of making an event-based automatic transaction on behalf of a user comprises determining an event geolocation impacted by an event. Based on a user device geolocation received from a user device of the user, the user is at the event geolocation is determined. In response to determining that the user is at the event geolocation, the event-based automatic transaction is automatically initiated and processed to digitally purchase goods or services on behalf of the user.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
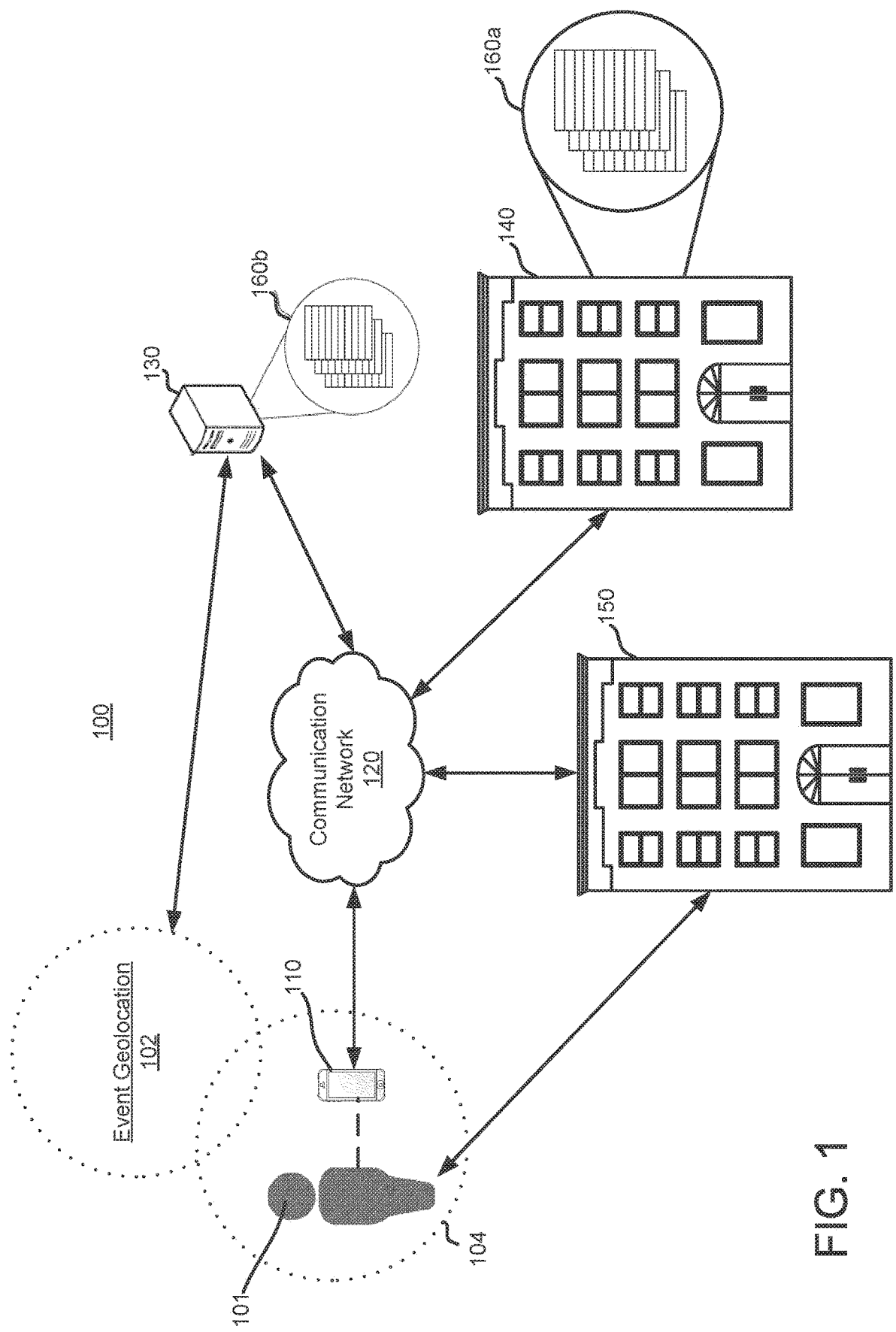
FIG. 1 is a diagram of a system for determining an event geolocation, and a user geolocation, and initiating an event-based automatic transaction on behalf of the user without user input, according to some arrangements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Arrangements described herein relate generally to systems and methods for initiating an event-based automatic transaction on behalf of a user without user input, if it is determined that a user geolocation is at an event geolocation, so as to obtain products on behalf of the user and deliver thereto.

Changing weather patterns, political unrest, and burden on natural resources by a burgeoning global population have resulted in many disaster events, including natural disasters, terrorists attacks, and health emergencies to name a few. Users of a financial institution (for example customers and employees of the financial institution) may find themselves at or close to an event geolocation, which may be associated with a geographical area significantly impacted by the event. The users are often notified of the event or seriousness (e.g., scale of impact) thereof when the event is very close to happening or has already occurred. Most users wait until such an event has occurred before attempting to purchase basic amenities and supplies (e.g., food, water, medicine, batteries, baby supplies, etc.). This creates a huge demand on retailers and other suppliers of such products. As witnessed during recent natural disasters, for example, hurricanes Harvey, Irma, Maria, Katrina, Sandy, the California wildfires, the Louisiana flooding, the Las Vegas shooting, etc., product supplies during such events often dwindle due to high demand, leaving many users unable to obtain products when most needed. Furthermore, many transportation routes may be blocked, preventing the users from traveling to locations where the products can be obtained. The transportation issues can also cause delayed access to the user from first responders. Limited access to the products may further exacerbate the situation, and may result in serious physical harm to the user and/or the family of the user. Furthermore, first responders and deliverers of goods and services may have a difficult time locating the users due to uncertainty of the users' locations during disasters, because the users may be at shelters or safe areas rather than in their own homes or at their places of employment.

Conventional systems may provide user notifications once the event has occurred. However, as described above, for a user present at the event geolocation, it may be too late for the user to obtain products that may be necessary for the user to survive the event. Systems, apparatuses, and methods described herein allow for a financial institution computing system to initiate and process an event-based automatic transaction without user input on behalf of the user if the user is determined to be at the event geolocation. This assures automatic acquisition and speedy delivery of products needed by the user to a user geolocation in a timely fashion, if the probability of the event occurring is very high, or the event has already occurred, so that the user can use the products and/or services as soon as possible. Conventional systems that do not implement automatic initiation and processing of transactions as described herein may instead rely on user-initiated transactions. Such systems rely on the operability of the user's device. If the user's device fails to function properly after the event, the user may not be able to acquire the goods and/or services needed to withstand the effects of the event.

In some arrangements, a financial institution computing system includes a network interface structured to facilitate data communication via a network, and a memory. The financial institution computing system also includes a processing circuit having a processor. The processing circuit is configured to receive, from an external notification system, an event message including information about an event. The processing circuit determines, from the event message, at least one of a probability of the event occurring and the event has occurred. In response to at least one of the probability of event occurring being above a predetermined threshold and the event having occurred, an event geolocation impacted by the event is determined. A user geolocation of the user is also determined. In response to determining that the user geolocation is at the event geolocation, the processing circuit initiates and processes an event-based automatic transaction without user input, on behalf of the user.

In various examples, the financial institution computing system determines the user geolocation from a user device geolocation of the user device. The event-based transaction is automatically authorized, without user authorization, if the user device geolocation is at the event geolocation. In some arrangements, the financial institution computing system may transmit to the user device before detection of the event or a determination that it is probable that the event has occurred or will occur, a first request for authorizing the event-based automatic transaction. A first authorization message can be received from the user device indicating that the user has authorized the financial institution computing system to initiate the event-based automatic transaction without the user input. In response to the user authorizing the financial institution computing system to initiate the event-based automatic transaction without the user input, the user may be added to an event transaction database.

In some arrangements, the financial institution computing system transmits information on a plurality of products and/or services to be included in the event-based automatic transaction to the user device, in response to the user authorizing the financial institution computing system to initiate the event-based automatic transaction without the user input. In such arrangements, a first transaction message is received from the user device indicating a set of the plurality of products selected by the user for including in the event-based automatic transaction if future events occur. The first transaction message is stored in the event transaction database.

In various arrangements, in response to the user authorizing the financial institution computing system to initiate future event-based automatic transactions without the user input, the financial institution computing system transmits information on a monetary limit of the event-based automatic transaction to the user device. In such arrangements, a monetary limit indicator (indicating a monetary limit of the event-based automatic transaction) is received from the user device and stored in the event transaction database.

In some arrangements, the financial institution computing system may transmit, to the user device, a recommendation on a plurality of additional products to be included in future event-based automatic transactions. A second transaction message may be received from the user device indicating that the user authorizes inclusion of at least a set (at least some) of the plurality of additional products in the future event-based automatic transactions. In response to the second transaction message, at least the set of the plurality of additional products are included in the event transaction database, in an entry associated with the user. In some arrangements, the financial institution computing system may transmit a delivery message to a delivery service instructing the delivery service to deliver a plurality of products associated with the event-based automatic transaction to the user. In various arrangements, the financial institution computing system may also transmit and update location information on at least one location where at least one of a plurality of products included in the event-based automatic transaction can be received and additional resources can be obtained.

Arrangements of the systems, apparatuses, and methods described herein may provide several benefits including, for example: (1) providing accurate and timely notifications to users of a financial institution on the event; (2) making event-based automatic transaction on behalf of the user and delivering the products thereto so as to ensure safety of the user; (3) provide notifications on locations of resources and services that may be needed by the user; (4) proactively provide benefits to the user based on event; (5) reducing panic associated with a rush to obtain disaster relief products/supplies when an event occurs; and (6) enhance user satisfaction, therefore enabling user retention and new user acquisition by the financial institution. The systems, apparatuses, and methods are capable of handling such automatic transactions for a large number of users instantaneously, allowing for timely and accurately processing of automatic digital transactions on a massive scale in response to disasters.

FIG. 1 is a diagram of an example system 100 for initiating an event-based automatic transaction 101 on behalf of a user 101 according to various arrangements. Referring to FIG. 1, the user 101 may include at least one of a customer of a financial institution 140 (e.g., an individual user or a business), or an employee thereof. While shown as a brick and mortar facility, in some arrangements, the financial institution 140 may include an online-only financial institution. In some arrangements, the user 101 may also include a prospective customer of the financial institution 140. In some arrangements, the user 101 may be an account holder of the at least one financial account at the financial institution 140. The user 101 operates or is otherwise associated with the user device 110, for communication with the financial institution 140 (e.g., a financial institution computing system 242 of the financial institution 140, as described with respect to FIG. 2). The user device 110 may include, for example a mobile phone (e.g., an iPHONE®, an ANDROID® phone, a WINDOWS® phone, a SYMBIAN® phone or the likes), a tablet computer, a personal computer (e.g., a desktop or a laptop), a smart TV, a smart watch, a gaming system, an IP TV box, or any other user device.

The user 101 may operate the user device 110 to access financial products and/or services provided by the financial institution 140, and/or receive notifications therefrom. According to non-limiting examples, the user 101 may use a mobile wallet or online payment features provided by the financial institution 140 to enroll in an event-based automatic transaction program, authorize future event-based automatic transactions, select products for including in the future event-based automatic transactions, or receive notifications on the event-based automatic transaction. The mobile wallet or online payment features may be provided through software applications on the user device 110.

The user device 110 is connected to the financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the user device 110 and the financial institution 140 (e.g., the financial institution computing system 242 of FIG. 2).

A financial information database 160a may store personal information of the user 101 as well as transaction history of the user 101. The financial information database 160a may also include information on whether the user 101 has enrolled in an event-based automatic transaction program, so as to allow the financial institution 140 to initiate and process future financial transactions on behalf of the user 101 without user input. For example, the financial information database 160a may include the event transaction database 262, included in the financial institution computing system 242 of FIG. 2. As used herein, the term "on behalf of the user" refers to the financial institution 140 acting as an agent for the user 101 and initiates/processes the event-based automatic transaction for the user 101 without user input, if the event-based automatic transaction has been pre-authorized by the user 101 at a previous time, before the event-based automatic transaction is initiated and processed. For example, the event-based automatic transaction may be performed if the user information of the user 101 is included in the financial information database 160a. In some arrangements, the financial institution 140 may request the user 101 to enter a personal identification code (e.g., a personal identification number (PIN), a password, a two factor authentication, last four digits of the user's 101 social security number, thumbprint, face recognition, etc.) before enrolling the user 101 in the event-based automatic transaction program, or otherwise initiating the event-based automatic transaction.

In some arrangements, the financial institution 140 is also in communication with an external notification system 130 via the communication network 120. The external notification system 130 may include but is not limited to a news feed (e.g., CNN®, FOX®, NBC®, BBC®, ABC®, CBS®, Reuters, the Weather Channel, Associated Press, etc.), a local weather service report, a global weather service report, a Doppler radar signal, an RSS feed, a TWITTER® feed, a FACEBOOK® post, an INSTAGRAM® feed, a podcast, and a user health signal (e.g., from a user health monitoring device). The external notification system 130 may generate an event message (e.g., a digital event notification message) communicated to the communication network 120, including information on at least one of a probability of the event occurring or the event having occurred, and an event geolocation 102.

Figures 5, 6:
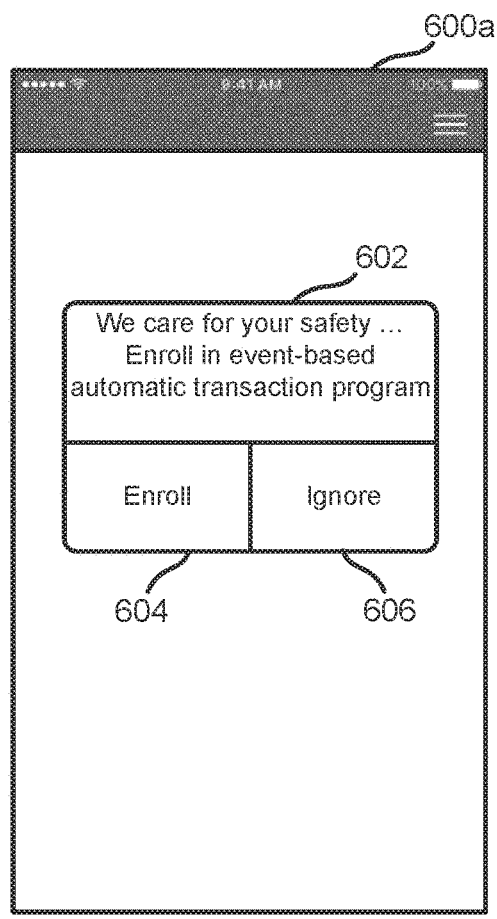
FIG. 5 is a table illustrating events that may generate an event geolocation and corresponding products that may be included in an event-based automatic transaction on behalf of the user if the user geolocation is at the event geolocation, according to various arrangements.
FIG. 6 is an interface display diagram illustrating an interactive interface for receiving a notification to enroll in an event-based automatic transaction program, according to some arrangements.

Expanding further, FIG. 5 provides a non-exhaustive list of events 510 that may cause the external notification system 130 to generate the event message. Referring to FIGS. 1 and 5, such events may include but are not limited to a hurricane, a flood, an earthquake, a storm, a wild fire, a land slide, a terrorist attack, an active shooter event, and a health emergency. Furthermore, a disaster may not be classified as an event if it does not meet certain criteria specific for a type of event. For example, a disaster may be considered as an event if wind speeds are greater than 75 miles per hour, a storm surge is more than 3 feet, expected flooding is above 6 inches, wildfire is spreading at more than a mile in an hour and will not be contained in the foreseeable future, a terrorist attack or active shooter event with the terrorist or active shooter still on the loose, serious health ailment which may cause disability, etc.

Returning to FIG. 1, the event geolocation 102 corresponds to a predetermined geographical area within which the impact of the event is expected to be particularly severe. In some arrangement, the external notification system 130 may include an event database 160b configured to store parameters for determining the event geolocation 102, the severity of the event, and or other information relevant to the event. The event geolocation 102 and other parameters related to the event may be included in the event message.

In some arrangements, the event message, including information on the event is received from the external notification system 130. At least one of a probability of the event occurring or the event has occurred is determined. In response to the probability of the event occurring being above a predetermined threshold or the event having occurred, the event geolocation 102 impacted by the event is determined. For example, a first percentage of news or information sources received from the external notification system 130 (e.g., included in the event message) that indicate that the event is going to occur or has occurred is determined. Whether the first percentage is above a percentage threshold (e.g., more than 70%) is also determined.

An event geolocation 102 impacted by the event can be determined. For example, the event geolocation 102 may be a 25 mile radius of a storm zone, a hurricane zone or a flooding zone, a 10 mile radius of a terrorist attack, a city or county affected by the event, etc. A user geolocation 104 of the user 101 is determined. In some arrangements, the user geolocation 104 may be determined from a registered geolocation of the user 101, for example included in the financial information database 160a. For example, the user geolocation 104 may include a home address of the user 101 stored in the financial information database 160a. In various arrangements, the financial institution 140 determines the user geolocation 104 from a user device geolocation of the user device 110 associated with the user 101, for example via GPS data received from the user device 110 using geofencing or any other geolocation application.

If the user geolocation 104 is at the event geolocation 102 (e.g., a user device GPS location overlaps with the event geolocation 102), the event-based automatic transaction is initiated and processed without the user input on behalf of the user 101. For example, the financial institution computing system 242 (FIG. 2) may be in communication with a product supplier 150, for example a retailer (e.g., WAL-MART®, TARGET®, COSTCO®, SAMS CLUB®, ALDI®, KROGER®, etc.), or a private contractor, and purchase the products included in the automatic transaction therefrom. While shown as including a brick and mortar location, in some arrangements, the product supplier 150 may include a virtual supplier (e.g., AMAZON.com®, JET-.com®, etc.).

In some arrangements, the product supplier 150 may also include a delivery service. In such arrangements, the financial institution computing system 242 (FIG. 2) may transmit a delivery message to the product supplier 150 to deliver a plurality of products included in the event-based automatic transaction to the user 101, for example via delivery cars, vans, trucks, bikes, drones, autonomous vehicles, or the likes. Furthermore, the financial institution may constantly update the delivery service (e.g., a device of a driver of the delivery service, a GPS of an autonomous car/truck or unmanned aerial vehicle, and the likes) based on the user device geolocation data (e.g., GPS data) obtained from the user device 110.

In other arrangements, the product supplier 150 can also be a location where at least one of the plurality of products included in the event-based automatic transaction can be received and/or additional resources (e.g., cash, gas, health services, prescription medication, shelter, etc.) can be obtained. In still other arrangements, the financial institution 140 may include a mobile location, for example a mobile automatic teller machine (ATM), food and/or supply delivery van, mobile health van, etc. which the user 101 may access.

Figure 2:
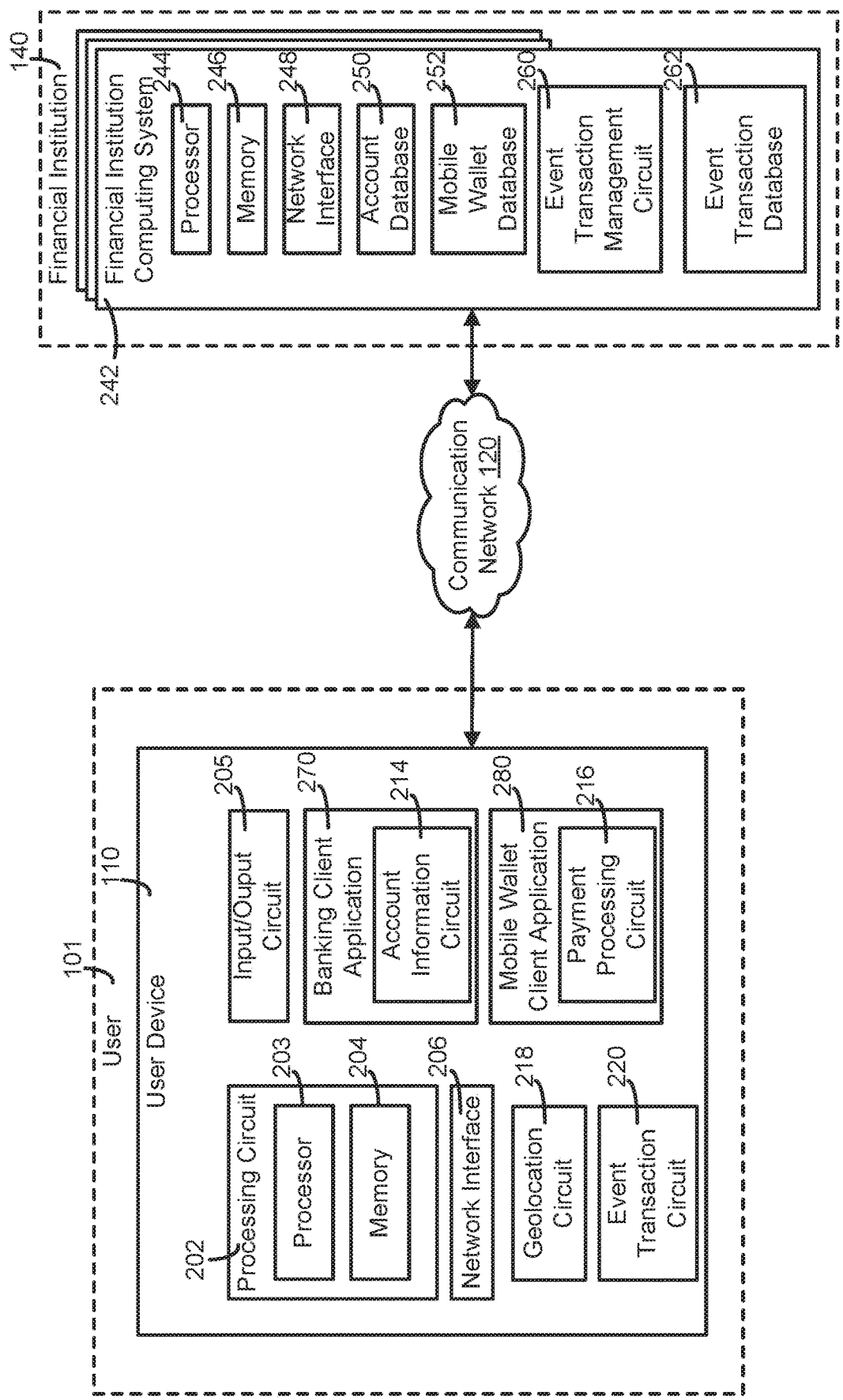
FIG. 2 is a diagram of a user device and a financial institution computing system of FIG. 1, according to some arrangements.

FIG. 2 is a diagram of an example of the user device 110 and the financial institution 140 of the system 100, set forth in FIG. 1 according to some arrangements. Referring to FIGS. 1-2, the financial institution 140 includes one or more of a bank branch, a loan office, a mortgage office, a financial service office, a retail office, an ATM location, a combination thereof and/or the like. The financial institution 140 has at least one associated financial institution computing system 242.

The financial institution 140 provides financial products and services such as, but not limited to, credit card accounts, mobile wallet, checking/savings account, retirement accounts, mortgage accounts, loan accounts, investment and financial accounts, and the like to the user 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 includes tangible, non-transient volatile memory, or non-volatile memory. The memory 246 may include a non-transitory processor 244 readable medium having stores programming logic that, when executed by the processor 244, controls the operations of the financial institution computing system 242. In some arrangements, the processor 244 and the memory 246 form various processing circuits described with respect to the financial institution computing system 242 (e.g., the event transaction management circuit 260).

As shown, the financial institution computing system 242 includes a network interface 248. The network interface 248 is structured for sending and receiving data over the communication network 120 (e.g., to and from the user device 110, etc.). Accordingly, the network interface 248 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The financial institution computing system 242 includes an account database 250 that stores customer information and account information relating to one or more accounts held by the user 101 with the financial institution 140. For example, the account database 250 may be included in the financial information database 160*a*. In this regard, more than one financial institution (such as, but not limited to, the financial institution 140) with an associated financial institution computing system (such as, but not limited to, the financial institution computing system 242) can be communicably coupled to the components of FIG. 2 over the communication network 120 to access the accounts held by the user 101. The account database 250 stores transaction history of transactions made by the user 101 using one or more accounts of the user 101, for example, with the banking client application 270, the mobile wallet client application 280, or with other suitable applications.

The financial institution computing system 242 may include a mobile wallet account database 252 for storing mobile wallet accounts of users, including the user 101. The mobile wallet accounts permit payments via a mobile wallet client application 280 of the user device 110. The mobile wallet account database 252 stores transaction history of transactions made by the user 101 using the mobile wallet client application 280.

The financial institution computing system 242 includes an event transaction management circuit 260. The event transaction management circuit 260 is capable of determining the user geolocation 104 (e.g., via a user device geolocation) and initiate the event-based automatic transaction without user input on behalf of the user 101, if the user geolocation 104 is within the event geolocation 102, as described in detail herein. The event transaction management circuit 260 is operably coupled to one or more of the components of the financial institution computing system 242. For example, the event transaction management circuit 260 may be coupled to the communication network interface 248 for communicating with one or more of the user device 110, the external notification system 130, or the product supplier 150 via the communication network 120. The event transaction management circuit 260 can request and receive information on whether the user 101 is enrolled in the event-based automatic transaction program stored in an event transaction database 262.

In some examples, the event transaction management circuit 260 is implemented with the processor 244. For example, the event transaction management circuit 260 can be implemented as a software application stored within the memory 246 and executed by the processor 244. Accordingly, such examples can be implemented with minimal or no additional hardware costs. However, other implementations may rely on dedicated hardware specifically configured for performing operations of the event management transaction circuit 260.

The event transaction management circuit 260 is coupled to one or more of the account database 250 or mobile wallet database 252 to access information stored thereon with respect to a transaction history of the user 101. In some arrangements, the financial institution computing system 242 includes or is otherwise operatively coupled to the financial information database 160a.

As shown, the user 101 operates or is associated with the user device 110. In some arrangements, the user device 110 includes a processing circuit 202 having a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 may include a non-transitory, processor readable medium (e.g., RAM, NVRAM, ROM, Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 110 is shown to include various circuits and logic for implementing the activities described herein. More particularly, the user device 110 includes one or more of a processing circuit 202, input/output circuit 205, network interface 206, geolocation circuit 218, event transaction circuit 220, account information circuit 214, payment processing circuit 216, banking client application 270, mobile wallet client application 280, or the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included.

The network interface 206 is configured for and structured to establish a communication session via the communication network 120 with the financial institution computing system 242. Accordingly, the network interface 206 is an interface such as, but not limited to, the network interface 248.

The input/output circuit 205 is configured to receive user input from and provide information to the user 101. In this regard, the input/output circuit 205 is structured to exchange data, communications, instructions, etc. with an input/output component of the user device 110. Accordingly, in some arrangements, the input/output circuit 205 includes an input/output device such as a display device, touchscreen, keyboard, microphone, a finger print reader, and/or the like. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangement, the input/output circuit 205 includes any combination of hardware components (e.g., a touchscreen), communication circuitry, and machine-readable media.

One or more of the banking client application 270 or mobile wallet client application 280 are server-based applications executable on the user device 110. In this regard, the user 101 has to first download the application(s) prior to usage. In another arrangement, the banking client application 270 and/or mobile wallet client application 280 are coded into the memory 204 of the user device 110. In still another arrangement, the banking client application 270 and/or mobile wallet client application 280 are web-based interface applications. In this configuration, the user 101 has to log onto or otherwise access the web-based interface before usage. In this regard, at least one of the banking client application 270 and mobile wallet client application 280 is supported by a separate computing system comprising one or more servers, processors, network interface modules, etc. that transmit the applications for use to the user device 110. In certain arrangements, one or more of the banking client application 270 and/or mobile wallet client application 280 include an Application Programming Interface (API) and/or a Software Development Kit (SDK) that facilitate integration of other applications. All such variations and combinations are intended to fall within the spirit and scope of the present disclosure.

The banking client application 270 is communicably coupled to the financial institution computing system 242 (e.g., the account database 250 and/or the event transaction database 262) via the network 202 and is structured to permit management of at least one account of the user 101 via the banking client application 270. In this regard, the banking client application 270 provides displays indicative of account information such as, but not limited to, current account balances, pending transactions, profile information (e.g., contact information), reward associated with the account, bill pay information and/or the like. Further, in some arrangements, the banking client application 270 is configured to process payments from the user 101 to a designated recipient. For example, the banking client application 270 depicts a loan (e.g., a mortgage, a personal loan, a car loan, a student loan, etc.) of the user 101 and allows the user 101 to pay the loan from an account (e.g., a checking or savings account associated with the user 101). In some examples, a bill pay option is provided by the banking client application 270, where the bill pay option allows the user 101 to pay his/her bills in response to user input.

As mentioned herein, via the banking client application 270, the user 101 pay bills (e.g., mortgage, etc.), view balances, pay merchants, and otherwise manage their account. Accordingly and as shown, the banking client application 270 includes an account information circuit 214. The account information circuit 214 is linked or otherwise coupled to one or more accounts (as stored in the account database 250) held by the user 101 and permits management of the associated accounts (e.g., transfer balances between accounts, view payment history, etc.) by communicating with the financial institution computing system 242. The banking client application 270 is communicably coupled to the mobile wallet client application 280. As such, in response to a mobile payment via the mobile wallet client application 280, the mobile wallet client application 280 causes the banking client application 270 to update the payment account (i.e., the account that supported the mobile payment). As such, the banking client application 270 and the mobile wallet client application 280 are communicably coupled to each other to enable actions supported by each respective application.

The mobile wallet client application 280 is communicably coupled to the financial institution computing system 242 (e.g., the mobile wallet database 252) via the communication network 120 and is structured to facilitate purchases by the user 101 via the mobile wallet client application 280. Accordingly, the mobile wallet client application 280 is linked or otherwise connected with one or more accounts (e.g., stored in the account database 250) of the user 101. In operation, when at a point-of-sale terminal, the user 101 initiates the mobile wallet client application 280 and provides a passcode (e.g., biometrics such as a thumbprint, facial recognition or retinal identification, a Personal Identification Number (PIN), a password, etc.) to authenticate the user 101 and select the source payment account desired (e.g., a checking account from a particular financial institution that is linked to the mobile wallet client application 280). Via communication with the payment terminal (e.g., via near field communication), the aforementioned payment information is provided to the POS terminal or the merchant (e.g., via NFC, via barcode presentment, etc.) and the payment is processed. Beneficially, carrying payment cards are avoided or reduced via the mobile wallet client application 280.

As mentioned herein, the mobile wallet client application 280 is structured to facilitate and permit payments by interfacing with an account held by the user 101 at the financial institution 140. Accordingly, the mobile wallet client application 280 is communicably coupled via the network interface 206 over the communication network 120 to the financial institution computing system 242. As shown, the mobile wallet client application 280 includes a payment processing circuit 216 structured to facilitate payments by the user 101 via the mobile wallet client application 280. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 280 and a POS terminal.

In some arrangements, the user device 110 includes a geolocation circuit 218, which may include, for example a GPS or any other positioning system configured to determine a user device geolocation of the user device 110. Since the user device 110 is associated with the user 101, the user device geolocation may generally correspond to the user geolocation 104, as described herein. The geolocation circuit 218 may be operably coupled to one or more of the components of the user device 110, for example the banking client application 270 and/or the mobile wallet client application 280. The geolocation circuit 218 communicates the user geolocation 104 to the financial institution computing system 242, for example the event transaction management circuit 260.

The user device 110 also includes an event transaction circuit 220, which may be included in the mobile wallet client application 280. The event transaction circuit 220 may provide the user 101 notifications about the event, request to enroll in the event-based transaction program, requests to select products to include in the event-based transaction, information on delivery time of a care package including the products purchased in the event-based transaction, locations for obtaining products or additional services, locations/schedules of mobile ATMs, evacuation routes, and/or any other information which may be useful to the user to survive the event. For example, the event transaction circuit 220 may be operably coupled to the input/output circuit 205 to display and receive user input concerning the event-based automatic transaction. The event transaction circuit 220 communicates the above information to the financial institution computing system 242 (e.g., the event transaction management circuit 260) for communicating event-based automatic transaction related messages with the financial institution computing system 242. Furthermore, the user choices regarding enrolling in the event-based automatic transaction program may be stored in the event transaction database 262.

According to some arrangements, in operation, the event transaction management circuit 260 may transmit to the user device 110 a first request for authorizing the event-based automatic transaction. The first request may be sent to the user device 110 before detection of the event or a determination that it is probable that the event has occurred. For example, the event transaction management circuit 260 may send the first request hours, days, months or years before the event has occurred requesting a user authorization to allow the financial institution computing system 242 to initiate the event-based automatic transaction if an event occurs on behalf of the user without user input.

The financial institution computing system 242 may receive from the user device 110, a first authorization message indicating that the user 101 has authorized the financial institution computing system 242 to initiate the event-based automatic transaction without the user input. In other words, the first authorization message informs the financial institution computing system 242 that the user 101 has preauthorized the financial institution computing system 242 to act as an agent for the user and initiate and process future event-based automatic transaction on behalf of the user 101 if an event is detected.

In other arrangements, the first request may be transmitted to the user 101 after the event has occurred, or a determination that it is probable that the event has occurred. In response to the user 101 authorizing the financial institution computing system 242 to initiate future event-based automatic transaction without the user input, the user 101 is added to an event transaction database 262. The event transaction database 262 may be accessed when an event is detected by the financial institution computing system 242 to determine if the user 101 is enrolled in the event-based automatic transaction program.

In some arrangements, in response to the user 101 authorizing the financial institution computing system 242 to initiate the event-based automatic transaction without the user input, the event transaction management circuit 260 may transmit information on a plurality of products to be included in the event-based automatic transaction to the user device 110. For example, FIG. 5 shows a non-exhaustive list of products 520 that may be included the event-based automatic transaction. The financial institution computing system 242 can transmit the list of products 520 to the user device 110, and the user 101 can select a set (some or all) of the plurality of products to be included in a care package for delivering to the user 101 if the user geolocation 104 is within the event geolocation 102, as described herein. The financial institution computing system 242 may receive a first transaction message from the user device 110 indicating the set of the plurality of products selected by the user 101 for including in one or more future event-based automatic transaction. The first transaction message may also be stored in the event transaction database 262.

In various arrangements, in response to the user 101 authorizing the financial institution computing system 242 to initiate and process the event-based automatic transaction without the user input, the financial institution computing system 242 may transmit information on a monetary limit of the event-based automatic transaction to the user device 110 to prompt the user 101 to set the monetary limit. For example, the user 101 may set the monetary limit for the event-based automatic transaction (e.g., $100, $200, $300, $400, $500, $600, $700, $800, $900, $1,000, $2,000, $3,000, $4,000, $5,000 any other value or range). The financial institution computing system 242 may receive monetary limit indicator from the user device 110 indicating the monetary limit of the event-based automatic transaction, and store the monetary limit indicator in the event transaction database 262. In this manner, the user 101 controls the amount of money spent on future event-based automatic transactions.

In some arrangements, the financial institution computing system 242 (e.g., the event transaction management circuit 260 included therein) may receive, from the external notification system 130, an event message including information about an event (e.g., the events included in the list of events 510 or any other event described herein). The financial institution computing system 242 determines at least one of a probability of the event occurring or the event has occurred from the event message. For example, the event message may include one or more digital signals, received from the external notification system 130, which include detailed information about the event. Furthermore, the financial institution computing system 242 may be configured to collate and/or analyze the digital signals to determine a probability of the event occurring and/or the event has occurred. For example, the event transaction management circuitry 260 can store predefined parameters and analysis applications to analyze the one or more digital signals to make a determination that it is probable that the event will occur or has already occurred.

In response to at least one of the probability of event occurring being above a predetermined threshold, as described previously, and the event having occurred, the financial institution computing system 242 determines the event geolocation 102 impacted by the event. Furthermore, the financial institution computing system 242 determines the user geolocation 104 of the user 101.

In some arrangements, the financial institution computing system 242 determines the user geolocation 104 from a registered geolocation of the user 101. For example, the event transaction management circuitry 260 may be operably coupled to the event transaction database 262 and/or the account database 250, which may include information about a registered geolocation of the user 101 (e.g., the user's 101 permanent or temporary home address, work address, a temporary shelter address, and the like). In other arrangements, the user geolocation 104 is determined from the user device geolocation of the user device 110 associated with the user 101, which corresponds to the user geolocation 104. In such arrangements, the financial institution computing system 242 may be in continuous or sequential communication with the user device 110 and obtain the user geolocation 104 therefrom. In other arrangements, during normal circumstances when no event is detected the financial institution computing system 242 may access the user geolocation 104 only when the user 101 accesses the banking client application 270 and/or the mobile wallet client application 280. Once an event is detected, the financial institution computing system 242 may access the user geolocation 104 on a continuous or sequential basis so as to update the user geolocation 104 in real time, thus determining the most current user geolocation 104.

In response to determining that the user geolocation 104 is at the event geolocation 102, the financial institution computing system 242 (e.g., the event transaction management circuit 260) initiates an event-based automatic transaction without user input on behalf of the user 101. The event-based automatic transaction may include at least the set of products selected by the user to be included in the automatic transaction. In this manner, goods and/or services are purchased on behalf of the user 101 drastically reducing response time and uncertainty, so that the user 101 can use them in a timely fashion.

In particular arrangements, in response to the financial institution computing system 242 determining that the user 101 is at the event geolocation 102, the financial institution computing system 242 may also transmit a notification signal including information on the event to the user 101. For example, the notification signal may include information on an impact area of the event, delivery time/date of the care package including the set of products purchased in the event-based automatic transaction, names, address and/or coordinates of locations where additional supplies may be received or services obtained, location and/or schedule of mobile ATMs, safe evacuation routes, and any other information which may be beneficial to the user 101. In some arrangements, the notifications may offer rewards for signing up in the event-based automatic transaction program, for example, rewards points, free products or services for the user 101, loan forgiveness, providing specific goods or services to the user 101 based on the nature and/or impact of the event, offer loans with very low interest rates, car loans, vehicle replacement programs, etc.

In particular arrangements, in response to the user 101 not having pre-authorized the financial institution computing system 242 to initiate the event-based automatic transaction on behalf of the user 101, the financial institution computing system 242 may transmit a second request to the user 101 (e.g., via the notification signal) for authorizing the financial institution computing system 242 to initiate the event-based automatic transaction on behalf of the user 101. In this manner, the financial institution computing system 242 may offer another opportunity to allow the event-based automatic transactions, even if the user 101 did not enroll in the program at an earlier time (e.g., an enrollment period of the program). The second request may be transmitted a predetermined time before the event occurs (e.g., 6 hours, 8 hours, 10 hours, 12 hours, 12 hours, 24 hours, 2 days, 3 days, or any other range or value therebetween), and/or after the event has occurred.

In some arrangements, the financial institution computing system 242 may transmit a recommendation on a plurality of additional products to be included in the event-based automatic transaction to the user device 110 (e.g., included in the notification signal), for example, products not included in the set of the plurality of products selected by the user 101 for inclusion in the event-based automatic transaction. The financial institution computing system 242 receive a second transaction message from the user device 110 indicating that the user 101 authorizes inclusion of at least a set of the plurality of additional products in the event-based automatic transaction. In response to the second transaction message, the financial institution computing system 242 may include at least the set of the plurality of additional products in the event transaction database.

In various arrangements, the financial institution computing system 242 can transmit a delivery message to a delivery service (e.g., the product supplier 150) instructing the delivery service to deliver a plurality of products included in the event-based automatic transaction to the user 101. In other arrangements, the financial institution computing system 242 may transmit to the user device 110 information on at least one location from where at least one of the plurality of products included in the event-based automatic transaction can be received and/or additional resources (e.g., cash, gas, first aid, prescription medication, health services, shelter, etc.) can be obtained. For example, the user 101 may have indicated a preference to pick up the products from a specified location rather than having the products delivered to the user geolocation 104 during an enrollment process in the event-based automatic transaction program.

In still other arrangements, the financial institution computing system 242 may transmit the user geolocation 104 to a first responder. For example, if the user 101 does not respond to notifications for a predetermined period of time and/or a the event includes a medical emergency, the financial institution computing system 242 may alert a first responder of a possible emergency with the user 101, and provide them with the updated user geolocation 104 obtained from the user device 110.

Figure 3:
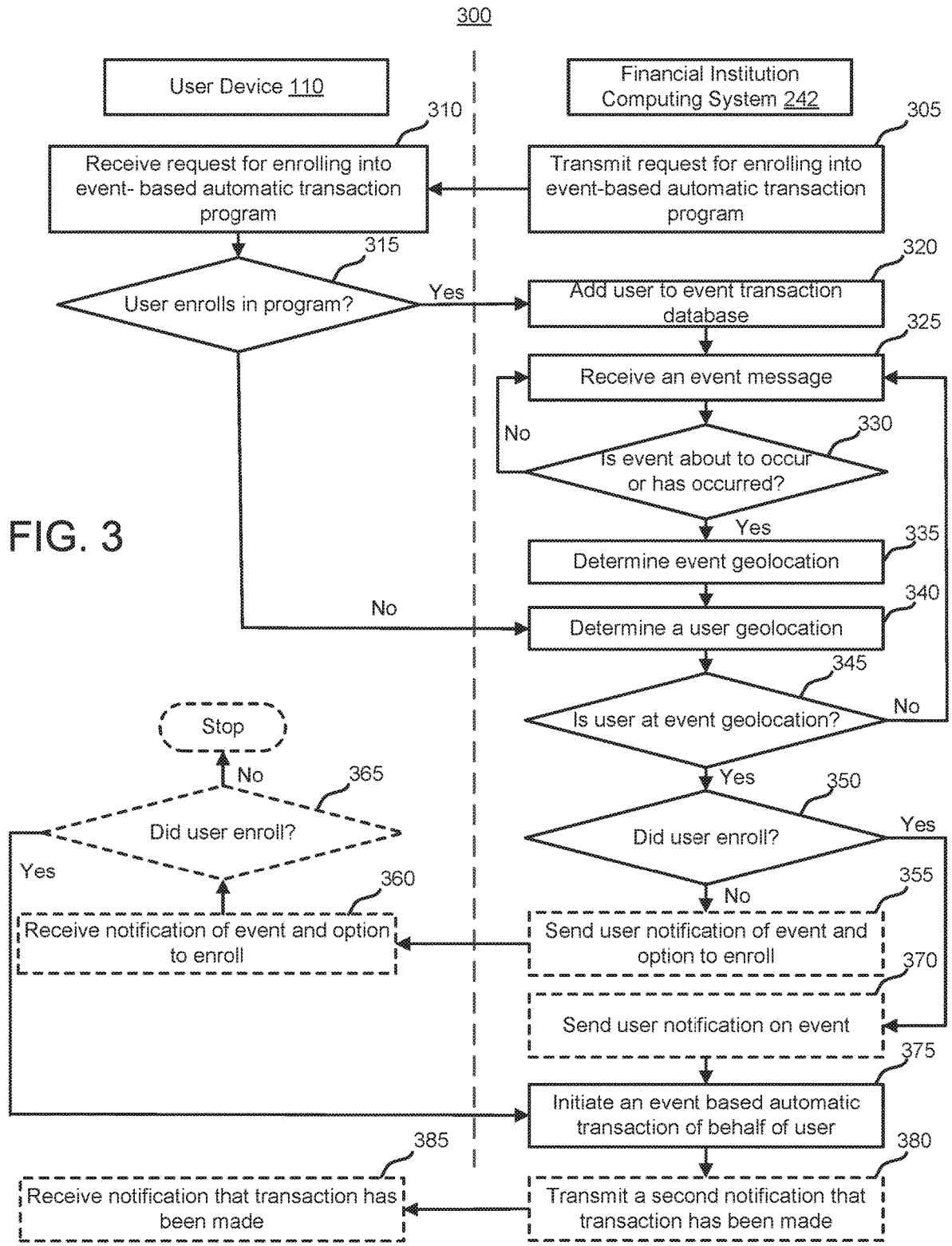
FIG. 3 is a flow diagram illustrating a method for initiating an event-based automatic transaction according to some arrangements.

FIG. 3 is a flow diagram illustrating a method 300 for initiating and processing an event-based automatic transaction, according to various arrangements. Referring to FIGS. 1-3, the method 300 is generally initiated when the financial institution computing 242 receives an event message including information on an event, as described above. In various arrangements, the financial institution computing system 242 determines at least one of a probability of the event occurring or the event has occurred. In response to determining at least one of the probability of the event being above the predetermined threshold (as described before herein), or the event having already occurred, the financial institution computing system 242 determines the event geolocation 102 impacted by the event. The financial institution computing system 242 also determines the user geolocation 104. In response to determining that the user geolocation 104 being at the event geolocation 102, the financial institution computing system 242 initiates and processes the event-based automatic transaction without the user input on behalf of the user 101.

In some arrangements, the method 300 includes sending a request for enrolling into an event-based automatic transaction program, at 305. For example, the event transaction management circuit 260 may transmit a request to the event transaction circuit 220 of the user device 110 to enroll in the event-based automatic transaction program. In particular arrangements, the request may include a first request for authorizing future event-based automatic transaction without user input on behalf of the user 101. The first request may be transmitted to the user device 110 before detection of the event or determination that it is probable that the event has occurred.

The user device 110 receives the request for enrolling into the event-based automatic transaction program, at 310. For example, the event transaction circuit 220 may receive the request from the financial institution computing system 242. The request (e.g., the first request) may be displayed on the user device 110 as a notification in the banking client application 270 and/or the mobile wallet client application 280 via the input/output circuit 205. The user device 110 may receive a user input indicating whether the user 101 wants to enroll in the event-based automatic transaction program, at 315. For example, the user device 110 may receive a request from the financial institution computing system 242 for enrolling the event-based automatic transaction in the program. The request may be displayed on an interactive interface (e.g., the interactive interface of FIG. 6) as a window requesting the user to enroll via input/output circuit 205. The interactive interface may be displayed as a window within the banking client application 270, and/or the mobile wallet client application 280. The user device 110 receives an input from the user 101 via the interactive interface indicating the user's 101 choice regarding enrollment. The user device 110 transmits an authorization message to the financial institution computing system 242 indicating whether the user 101 decides to enroll in the event-based automatic transaction program or opt out thereof.

If the user 101 does not enroll in the event-based automatic transaction program (315:NO), the method 300 moves to operation 340, as described below herein. If the user 101 enrolls in the event-based automatic transaction program (315:YES), the financial institution computing system 242 adds the user 101 to the event transaction database 262, at 320. For example, the financial institution computing system 242 may receive a request from the user device 110 indicating that the user 101 has authorized the financial institution computing system 242 to initiate and process one or more future event-based automatic transactions on behalf of the user 101. In response to the user 101 authorizing the financial institution computing system 242 to initiate the event-based automatic transaction on behalf of the user 101, the financial institution computing system 242 adds the user 101 to the event transaction database 262. For example, the financial institution computing system 242 may receive a first authorization message from the user device 110 indicating that the user 101 has authorized the financial institution computing system 242 to initiate and process one or more future event-based automatic transaction on behalf of the user 101. In response to the first authorization message, the financial institution computing system 242 adds the user 101 to the event transaction database 262

In some arrangements, the financial institution computing system 242 may also transmit information on a plurality of products to be included as a part of one or more future event-based automatic transactions in response to the user 101 authorizing the financial institution computing system 242 to initiate and process the one or more future event-based automatic transactions on behalf of the user 101. In such arrangements, the financial institution computing system 242 may receive a first transaction message from the user device 110 indicating at least a set of the plurality of products selected by the user 101 for including in the future event-based automatic transaction. The financial institution computing system 242 stores the first transaction message and/or information contained therein (e.g., a list of the set of the plurality of products, locations and/or links of one or more product suppliers 150, etc.) in the event transaction database 262 (e.g., as an entry associate with the user 101).

In still other arrangements, in response to the user 101 authorizing the financial institution computing system 242 to initiate the event-based automatic transaction on behalf of the user 101, the financial institution computing system 242 may transmit information on a monetary limit for the event-based automatic transaction to the user device 110, to prompt the user 101 to set a monetary limit for one or more of the future event-based automatic transactions. The financial institution computing system 242 may receive a monetary limit indicator from the user device 110 indicating or otherwise setting the monetary limit (e.g., an upper monetary limit) of the event-based automatic transaction. The financial institution computing system 242 stores the monetary limit indicator in the event transaction database 262, (e.g., as an entry associated with the user 101). In this manner, the user 101 may control how much money is spent on the event-based automatic transaction.

The financial institution computing system 242 receives an event message, at 325. For example, the financial institution computing system 242 may receive an event message from the external notification system 130 including information about the event in some arrangements. The financial institution computing system 242 determines whether the event is about to occur or has occurred, at 330. The financial institution computing system 242 may determine a probability of the event occurring and/or an event has occurred, as previously described herein. If the financial institution computing system 242 determines that it is not probable that the event is about to occur or has occurred (330:NO), the method 300 returns to operation 325.

However, if the financial institution computing system 242 determines that the event is about to occur or has occurred (330:YES), the financial institution computing system 242 determines an event geolocation, at 335. For example, in response to the probability of the event occurring being above a predetermined threshold and/or the event having already occurred, as previously described herein, the financial institution computing system 242 determines the event geolocation 102 impacted by the event (e.g., from the event message).

A user geolocation is determined, at 340. For example, the financial institution computing system 242 can receive a GPS signal from the geolocation circuit 218 of the user device 110, the GPS signal indicative of the user geolocation 104. In other arrangements, the financial institution computing system 242 may access the account database 250 and/or the event transaction database 262 to access a stored user geolocation 104. When using the user device geolocation as a proxy for the user geolocation 104, the financial institution computing system 242 may constantly and/or sequentially communicate with the user device 110 to receive the most up-to-date information on the user geolocation 104.

The financial institution computing system 242 determines if the user 101 is at the event geolocation, at 345. For example, the financial institution computing system 242 may use the user geolocation 104 determined from the GPS coordinates of the user device 110 to determine if the user 101 is at the event geolocation 102. The event geolocation 102 corresponds to a specific geographical area, and if the GPS coordinates of the user device 110 corresponds to, overlaps with or is generally within the event geolocation 102, this implies that user device 110 is at the event geolocation 102. If the user 101 is not at the event geolocation 102 (345:NO), the method 300 returns to operation 325. If however, the user 101 is at the event geolocation 102 (345:YES), the financial institution computing system 242 determines if the user 101 is enrolled in the event-based automatic transaction program, at 350. For example, the event transaction management circuit 260 of the financial institution computing system 242 may access the event transaction database 262 to determine if the user 101 is enrolled in the event-based automatic transaction program.

In some arrangements, if the user 101 did not enroll in the event-based automatic transaction program, the financial institution computing system 242 may optionally transmit to the user device 110 a notification of the event and option to enroll in the event-based automatic transaction program, at 355. For example, the financial institution computing system 242 may transmit a second request to the user device 110 for authorizing the financial institution computing system 242 to initiate the event-based automatic transaction without the user input, on behalf of the user 101 in response to determining that the user 101 not having enrolled in the event-based automatic transaction program. The second request may be sent a predetermined time before the event occurs (e.g., 6 hours, 8 hours, 10 hours, 12 hours, 12 hours, 24 hours, 2 days, 3 days, or any other range or value therebetween), and/or after the event has occurred.

In some arrangements, the user 101 receives the notification of the event and the second request for enrolling in the event-based automatic transaction program, or otherwise authorizing the financial institution computing system 242 to initiate the event-based automatic transaction without user input on behalf of the user 101, at a 360. The user device 110 determines whether the user 101 enrolls in the event-based automatic transaction program, at 365. For example, the user device 110 receives the second request from the financial institution computing system 242 and displays in an interactive interface (e.g., the interactive interface of FIG. 6) as a window requesting the user to enroll via input/output circuit 205. The interactive interface may be displayed as a window within the banking client application 270, and/or the mobile wallet client application 280. The user device 110 receives an input from the user 101 via the interactive interface indicating the user's 101 choice regarding enrollment in response to the second request. The user device 110 transmits a second authorization message to the financial institution computing system 242 indicating whether the user 101 decides to enroll in the event-based automatic transaction program or opt out thereof in response to the second request.

The financial institution computing system 242 may receive a second authorization message from the user device 110 that the user 101 has authorized the financial institution computing system 242 to initiate the event-based automatic transaction without the user input on behalf of the user 101. If the user 101 does not enroll in the event-based automatic transaction program (365:NO), or does not authorize the financial institution computing system 242 to initiate the event-based automatic transaction, the method 300 stops. On the other hand, if the user 101 enrolls or authorizes the financial institution computing system 242 (365:YES), the method 300 proceeds to operation 375.

Returning to operation 350, if the financial institution computing system 242 determines that the user 101 is enrolled in the event-based automatic transaction program (350:YES), the financial institution computing system 242 may optionally transmit to the user device 110 a notification on the event, at 370. In some arrangements, the notification may include information about the event, including but not limited to, a scale, a magnitude, an impact area, location of emergency personnel, emergency contact numbers, and/or the likes. In some arrangements, the operations 355, 360, 365 and 370 are excluded from the method 300. In such arrangements, once the user 101 has pre-authorized the financial institution computing system to initiate the future event-based automatic transaction on behalf of the user 101, the financial institution computing system 242 does not request a subsequent user input to initiate the event-based automatic transaction if an event is detected and the user device 110 is within the event geolocation 102.

In particular arrangements, the financial institution computing system 242 may transmit a recommendation on a plurality of additional products to be included in the event-based automatic transaction, to the user device 110. For example, the additional products may include products not selected by the user 101 in the first transaction message, or other products (e.g., additional emergency supplies, rewards, information on financial products, low interest loans, carpooling services, etc.). The financial institution computing system 242 may receive a second transaction message from the user device 110 indicating that the user 101 authorizes inclusion of at least a set of the plurality of additional products in the event-based automatic transaction. In response to second transaction message, the financial institution computing system 242 may include at least the set of the plurality of additional products in the event-based automatic transaction. In still other arrangements, the notification may include an option to opt-out from the event-based automatic transaction, or otherwise un-enroll from the event-based automatic transaction program. In such arrangements, the financial institution computing system 242 may continue with the event-based automatic transaction if a request for un-enrolling is not received from the user device 110 within a predetermined time.

The financial institution computing system 242 initiates and processes the event-based automatic transaction without user input (e.g., without user input to direct the financial institution computing system 242 to initiate or process any transactions) on behalf of the user 101, at 375. For example, the financial institution computing system 242 may purchase at least the set of the plurality of products and/or the set of the plurality of additional products from the product supplier 150 without user input.

In various arrangements, the financial institution computing system 242 may also transmit a delivery message to a delivery service to deliver the plurality of products included in the event-based automatic transaction to the user 101. For example, the product supplier 150 may also include a delivery service, or have the financial institution 140 may have an arrangement with a third party delivery service to deliver at least the set of the plurality of products to the user 101. The financial institution computing system 242 may constantly provide up to date information on the user geolocation 104 to a GPS device of a driver of a car/truck of the delivery service, and/or update GPS of an autonomous vehicle (e.g., a driverless car, unmanned aerial vehicle, etc.) so as to ensure timely delivery of the plurality of products to the user 101.

In some arrangements, the financial institution computing system 242 may send a second notification to the user device 110 that the event-based automatic transaction has been made, at 380. The second notification may be received by the user device 110, at 385. In particular arrangements, the second notification may include an option for the user 101 to cancel the event-based automatic transaction within a predetermined cancelation time. In other arrangements, the second notification may also include additional information, for example, delivery date/time of a care package including the plurality of products, a receipt indicating the monetary value of the event-based automatic transaction, information on locations where the user 101 may pick up additional supplies, locations/schedule of mobile ATMs, location and contact info of emergency responders, and safe evacuation routes.

In some arrangements, the second notification message may also include information on where the plurality of products included in the event-based automatic transaction can be received and/or additional resources can be obtained, for example, if the user 101 does not prefer delivery to the user geolocation 104. In some arrangements, the financial institution computing system 242 may also transmit the user geolocation to a first responder, for example if it is determined that the user geolocation 104 is within a particularly severely impacted area of the event geolocation 102 (e.g., if egress routes from the user geolocation are blocked, supplies are running particularly low, epicenter of earthquake, etc.) or the event includes a personal health emergency, as described previously herein.

Figure 4:
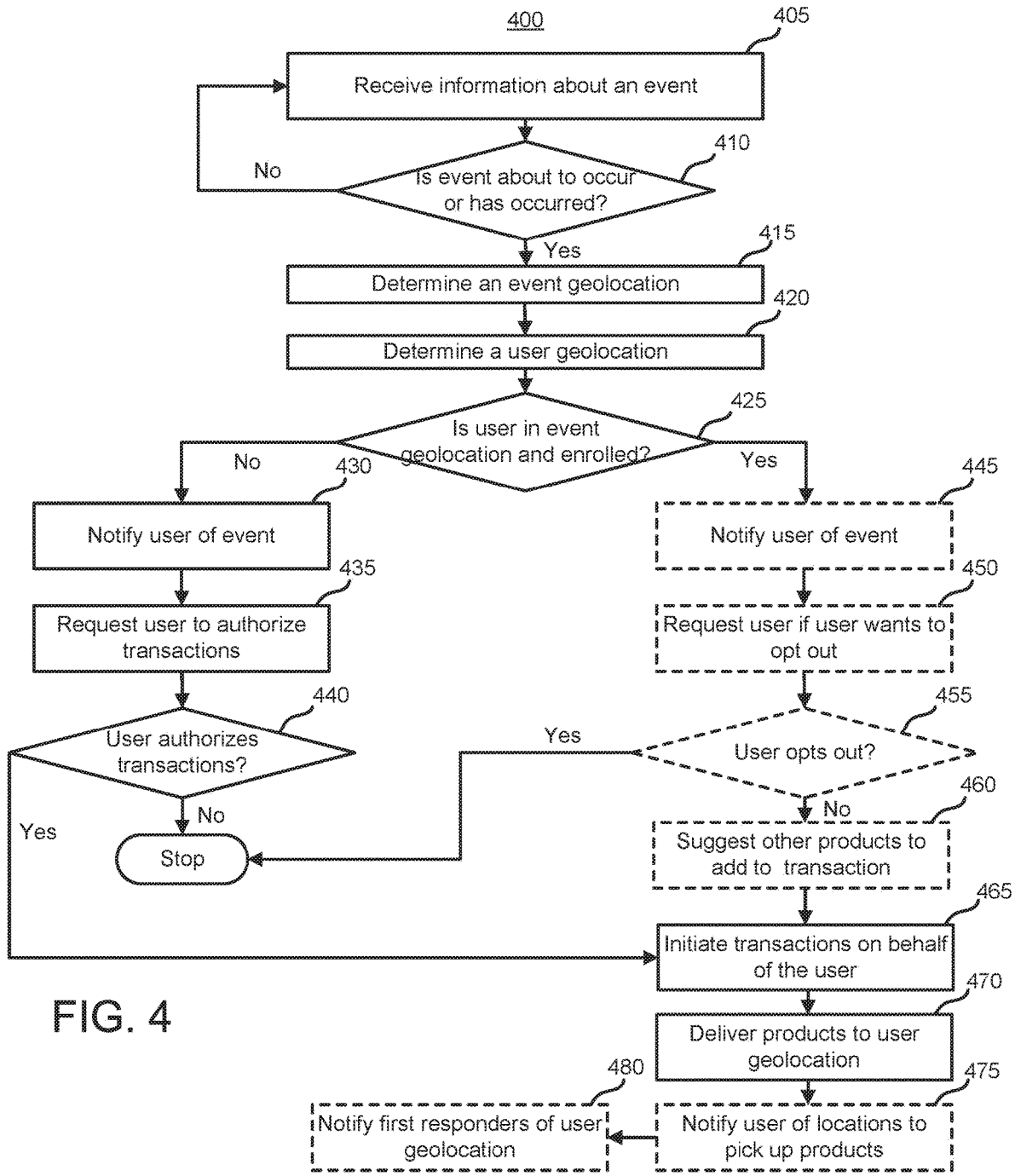
FIG. 4 is a flow diagram illustrating a method for initiating an event-based automatic transaction according to some arrangements.

FIG. 4 is a flow diagram illustrating a method 400 for initiating an event-based automatic transaction on behalf of the user 101 who may, or may not be enrolled in an event-based automatic transaction program, according to various arrangements. Referring to FIGS. 1-4, the method 400 is generally initiated when the financial institution computing system 242 receives information about an event, at 405. For example, the financial institution computing system 242 receives an event message from the external notification system 130, which includes information about the event (e.g., any of the events described herein).

The financial institution computing system 242 determines from the event message a probability of the event occurring and/or the event has already occurred, at 410. For example, the financial institution computing system 242 may analyze one or more digital signals received from the external notification system 130 (e.g., via the event transaction management circuit 260) so as to determine the probability of the event occurring and/or the event has occurred. In response to at least one of a probability of the event occurring being above a predetermined threshold and/or the event having occurred (410:YES), the financial institution computing system 242 determines the event geolocation 102 impacted by the event, at 415. For example, the financial institution computing system 242 determines a geographical area or radius impacted by the event.

The financial institution computing system 242 further determines the user geolocation 104 of the user 101, at 420. For example, the event transaction management circuit 260 of the financial institution computing system 242 may receive GPS coordinates of the user device 110 associated with the user 101 from the geolocation circuit 218 corresponding to the user geolocation 104. The financial institution computing system 242 determines if the user 101 is at the event geolocation 102 and/or the user 101 had previously enrolled in the event-based automatic transaction program, at 425.

In some arrangements, if the user 101 is not at the event geolocation 102 and/or the user 101 had not enrolled in the event-based automatic transaction program (425:NO), the financial institution computing system 242 notifies the user 101 of the event, at 430. The financial institution computing system 242 then transmits a request to the user device 110, requesting the user 101 to authorize the event-based automatic transaction without the user input on behalf of the user 101, at 435. For example, the user 101 may not be at the event geolocation 102, but may still want to authorize the event-based automatic transactions so that the plurality of products included in the event-based automatic transaction may be delivered to family or other related individuals who may still be in the event geolocation 102. Similarly, the user 101 may have ignored or opted out of an initial request to authorize the event-based automatic transaction, but may now be interested in authorizing the event-based automatic transactions.

If the user 101 does not authorize the event-based automatic transactions (440:NO), the method 400 stops. If on the other hand, the user 101 authorizes the financial institution computing system 242 (440:YES) to initiate the event-based automatic transaction (e.g., via a transaction message transmitted from the user device 110 to the financial institution computing system 242), the financial institution computing system 242 initiates the event-based automatic transaction without user input on behalf of the user 101, at 465.

In some arrangements, if the financial institution computing system 242 determines at operation 425 that the user 101 is at the event geolocation and is enrolled in the event-based automatic transaction program (425:YES), the financial institution computing system 242 may notify the user of the event, at 445. For example, the financial institution computing system 242 may send a notification concerning the event, and including information thereof (e.g., the event geolocation 102, scale of impact, location of emergency services, locations where supplies may be obtained, etc.). In various arrangements, the financial institution computing system 242 may also transmit a request to the user 101 inquiring if the user 101 wants to opt out of the event-based automatic transaction program, or otherwise decline the authorization for the financial institution computing system 242 to initiate the event-based automatic transaction without user input on behalf of the user 101, at 450. The financial institution computing system 242 may determine if the user 101 remains enrolled or opts out, at 455. If the user 101 opts out or otherwise declines the authorization (455:YES), the method 400 stops.

In particular arrangements, if the user does not opt out, or otherwise does not decline the authorization (455:NO), the financial institution computing system 242 may transmit a recommendation suggesting a plurality of additional products for including in the event-based automatic transaction, at 460. For example, the financial institution computing system 242 may transmit the recommendations to the user device 110. The user 101 may select at least a set of the plurality of additional products to be included in the event-based automatic transaction. The user device 110 may send a second transaction message to the financial institution computing system 242 about the selection via the user device 110. In some arrangements, the operations 445, 450, 455 and 460 may be excluded from the method 400. In such arrangements, once the user 101 is enrolled in the event-based automatic transaction program, or has otherwise pre-authorized the financial institution computing system 242 to initiate the future event-based automatic transaction on behalf of the user 101, the financial notification does not request any user input before initiating the event-based automatic transaction once an event is detected.

As described before, the financial institution computing system 242 initiates the event-based transaction without user input on behalf of the user, at 465. The products are delivered to the user geolocation, at 470. For example, the financial institution computing system 242 may send a delivery message to a deliver service (e.g., provided by the product supplier 150) to deliver the plurality of products and/or the plurality of additional products included in the event-based automatic transaction to the user 101. In other arrangements, the financial institution computing system 242 may notify the user 101 (e.g., via a notification message to the user device 110) of locations where the plurality of products can be received, and/or additional products, supplies and/or services may be obtained, at 475. In other arrangements, the financial institution computing system 242 may also notify first responders of the user geolocation 104, at 480.

FIGS. 6-10 show various interactive interfaces which may be provided on the user device 110 for authorizing the event-based automatic transaction, according to various arrangements. Referring to FIGS. 1-10, the interactive interfaces of FIGS. 6-10 may be used with method 300, 400, 700, or any other method described herein, and may available on the user device 110 or any other user device described herein.

FIG. 6 shows an example interactive interface 600a which includes a window 602 displaying on the user device 110, a request from the financial institution computing system 242 to the user 101 to enroll in the event-based transaction program ("We care for your safety . . . Enroll in event-based automatic transaction program"). The window 602 also requests user input relative to enrolling in the event-based transaction management program. For example, selecting element 604 ("Enroll") enrolls the user 101 in the event based transaction management program, while selecting element 606 ("Ignore") omits the user 101 from the event-based transaction management program. The user's 101 choice may be transmitted to the financial institution computing system 242, and stored in the event transaction database 262.

Figure 7:
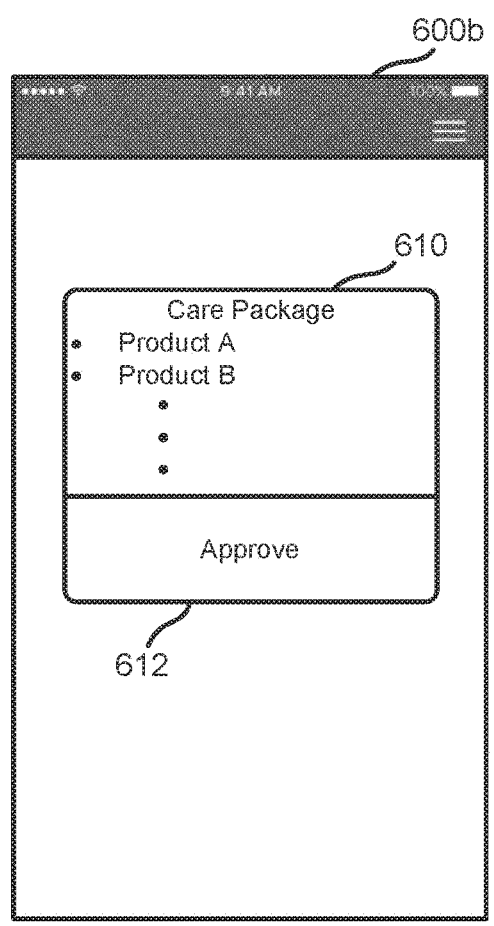
FIG. 7 is an interface display diagram illustrating an interactive interface for selecting a list of products for including in a care package purchased in the event-based automatic transaction, according to some arrangements.

FIG. 7 shows another example interactive interface 600b which includes a window 610 displaying on the user device 110, information on a plurality of products to be included in the event-based automatic transaction ("Care Package— Product A; Product B: . . . "), for example if the user 101 enrolls in the event-based automatic transaction program in the interactive interface 600a. In some arrangements, the window 610 may display a selection menu displaying the plurality of products (e.g., one or more products included in the list of products 520), enabling the user to select at least a set of the plurality of products to be included in the event-based automatic transaction. The window 602 also requests user input relative to approving the set of the plurality of products. For example, selecting element 612 ("Approve") approves the set of the plurality of products for inclusion in the event-based automatic transaction. A transaction message indicating the set of the plurality of products selected by the user 101 for including in the event-based automatic transaction may be transmitted by the user device 110 to the financial institution computing system 242, and stored in the event transaction database 262.

Figure 8:
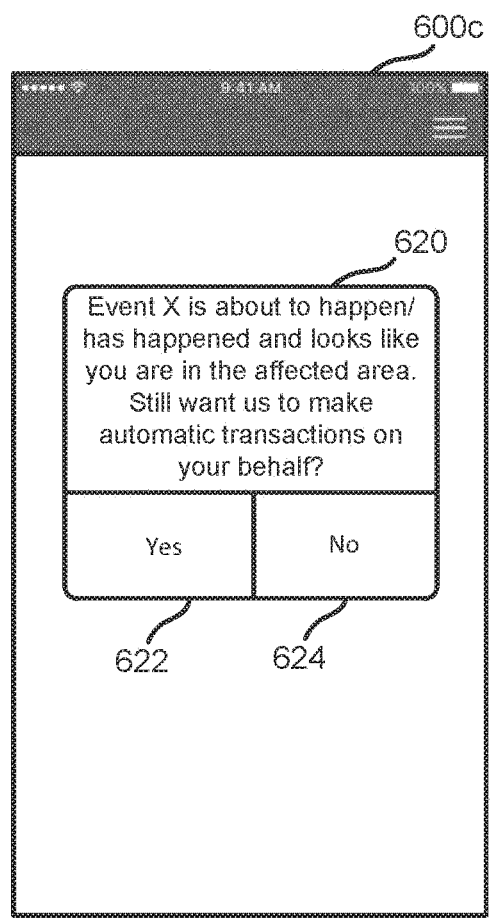
FIG. 8 is an interface display diagram illustrating an interactive interface for receiving a notification for an event, according to some arrangements.

FIG. 8 shows yet another example interactive interface 600c, which includes a window 620 displaying on the user device 110, notification that the event has about to happen and/or has happened, and if the user 101 wants to maintain the authorization to the financial institution computing system 242 to initiate the event-based automatic transaction on behalf of the user 101 ("Event X is about to happen/has happened and looks like you are in the affected area. Still want us to make automatic transactions on your behalf?"). For example, if the user 101 enrolled in the event-based automatic transaction system (e.g., in the interactive interface 600a), and the event is detected by the financial institution computing system 242, the interactive interface 600c may be displayed on the user device 110. The window 620 also requests user input relative to maintaining the authorization. For example, selecting element 622 ("Yes") maintains the authorization, while selecting element 624 ("No") revokes the authorization.

Figure 9:
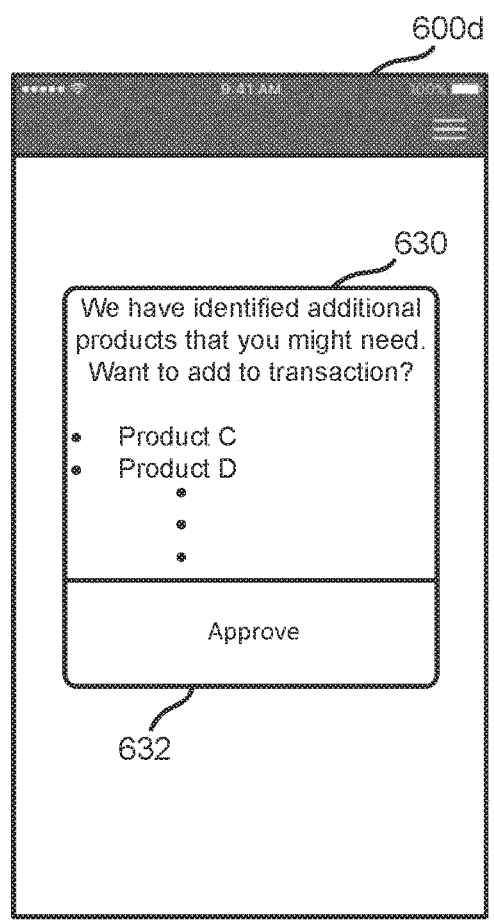
FIG. 9 is an interface display diagram illustrating an interactive interface for receiving a recommendation for selecting additional products to be included in an event-based automatic transaction, according to some arrangements.

FIG. 9 shows still another example interactive interface 600d, which includes a window 630 displaying on the user device 110, recommendation on additional products for inclusion in the event-based automatic transaction ("We have identified additional products that you might need. Want to add to transaction?—Product C; Product D; . . . ). In some arrangements, the window 630 may display a selection menu displaying the plurality of additional products (e.g., one or more products included in the list of products 520 not selected by the user in interactive interface 600b, and/or additional products), enabling the user to select at least a set of the additional products for inclusion in the event-based automatic transaction. For example, if the event is detected and the user 101 maintains the authorization for the financial institution computing system 242 to initiate the event-based automatic transaction on behalf of the user 101, the interactive interface 600d may be displayed on the user device 110. The window 630 also requests user input relative to approving the set of the plurality of additional products. For example, selecting element 632 ("Approve") approves the set of the plurality of additional products for inclusion in the event-based automatic transaction. A second transaction message indicating the set of the plurality of additional products selected by the user 101 for including in the event-based automatic transaction may be transmitted by the user device 110 to the financial institution computing system 242, and may be stored in the event transaction database 262.

Figure 10:
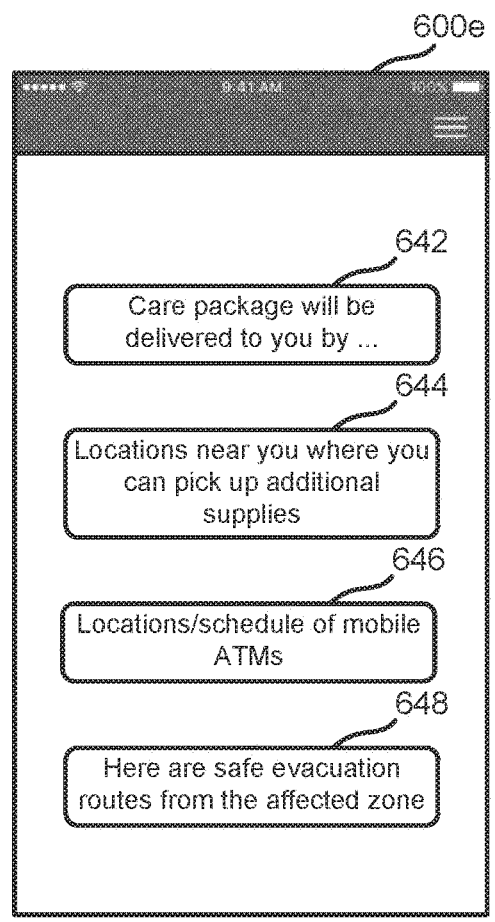
FIG. 10 is an interface display diagram illustrating an interactive interface for receiving various notifications related to an event and an event-based automatic transaction, according to various arrangements.

FIG. 10 shows another example interactive interface 600e which includes a plurality of windows displaying on the user device 110, various information related to the event-based automatic transaction and/or the event. In some arrangements, a window 642 displays a date and/or time of delivery of a care package including the plurality of products included in the event-based automatic transaction ("Care package will be delivered to you by . . . "). Window 642 may also include information about the delivery service, a tracking number, a receipt, and/or any other information pertinent to the event-based automatic transaction.

Window 644 displays information on locations near the user geolocation 104 where additional supplies may be obtained ("Locations near you where you can pick up additional supplies"). In particular arrangements, the window 644 also includes information on one or more locations where the care package can be obtained (e.g., if the user 101 does not wish to have the care package delivered). Window 646 displays information on locations/schedule of mobile ATMs ("location/schedule of mobile ATMs"). Furthermore, window 648 displays information on safe evacuation routes from the event geolocation 102 ("Here are safe evacuation routes from the affected zone"). For example, the financial institution computing system 242 may use third party map services (e.g., GOOGLE® maps, APPLE® maps, WAZE®, etc.) to determine the safe evacuation route, or provide a link to the user 101 thereto. It should be appreciated that while the interactive interface 600e includes windows 642, 644, 646 and 648 according to a particular arrangement, any number of windows including various information or notifications which may be of benefit to the user 101, may be included in the interactive interface 600e.

Figure 11:
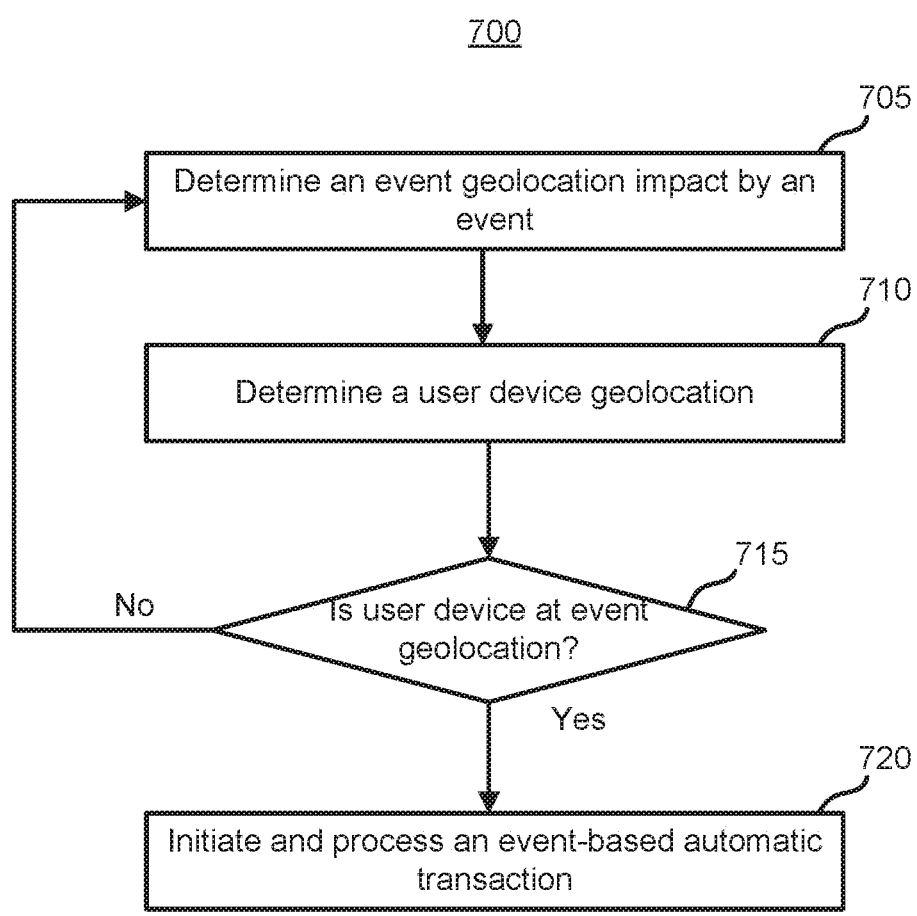
FIG. 11 is a flow diagram illustrating a method of initiating an event-based automatic transaction, according to some arrangements.

FIG. 11 is a flow diagram illustrating a method 700 for initiating and processing an event-based automatic transaction on behalf of a user (e.g., the user 101) in some arrangements. Referring to FIGS. 1-11, each of 705-720 corresponds to one or more of 305, 320-355, and 370-380 and/or to one or more of 405-480 of FIG. 4. The method 700 may include initiating and processing the event-based automatic transaction without user input in some examples. The method 700 can be implemented with the financial institution computing system 242 or any other suitable financial institution computing system described herein. The method 700 includes determining an event geolocation impacted by an event, at 705. For example, the financial institution computing system 242 receives an event message from the external notification system 130, and determines, based on the event message, the event geolocation 102, a probability of the event occurring, and/or the event has occurred, as described herein.

A user device geolocation is determined, at 710. For example, the financial institution computing system 242 determines a user device geolocation of the user device 110 associated with the user 101, which corresponds to the user geolocation 104, as described herein. Based on the user device geolocation of the user device of the user, whether the user device geolocation is at the event geolocation is determined, at 715. For example, the financial institution computing system 242 compares the user geolocation 104 with the event geolocation 102 to determine whether the user device geolocation is at the event geolocation.

In response to determining that the user device 110 is not at the event geolocation (715:NO), the method 700 returns to 705. In response to determining that the user device 110 is at the event geolocation (715:YES), the event-based automatic transaction is automatically initiated and processed to purchase goods or services on behalf of the user 101, at 720. For example, the financial institution computing system 242 can initiate and process the event-based automatic transaction without user input on behalf of the user, as described in detail herein.

It should be noted that the term "example" as used herein to describe various embodiments or arrangements is intended to indicate that such embodiments or arrangements are possible examples, representations, and/or illustrations of possible embodiments or arrangements (and such term is not intended to connote that such embodiments or arrangements are necessarily crucial, extraordinary, or superlative examples).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, touch sensitive screen or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and While this specification contains many specific implementation details, these should not be construed as limitations on the scope of any arrangement or of what may be claimed, but rather as descriptions of features specific to particular implementations of particular arrangements. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of making an event-based automatic transaction on behalf of a user, the method comprising:
    receiving, by a financial institution computing system from an external notification system, an event message including information about an event;
    determining, by the financial institution computing system from the event message, and based on a plurality of information sources including a plurality of news information sources independent of a particular physical location, a probability of the event occurring, the probability being based on a predetermined percentage of news information sources indicating that the event is going to occur or is occurring;
    in response to the probability of the event occurring satisfying a predetermined threshold corresponding to the predetermined percentage, determining, by the financial institution computing system from the event message, an event geofence including a plurality of geolocations impacted by the event;
    determining, by the financial institution computing system, a user geolocation of the user;
    determining, by the financial institution computing system, an authorized financial account associated with the user and provided by the financial institution computing system; and
    in response to determining that the user geolocation is at the event geofence, initiating without user input, by the financial institution computing system, the event-based automatic transaction with a mobile banking client application linked to the authorized financial account on behalf of the user, and transmitting, by the financial institution computing system, a notification including the user geolocation to a first responder.

2. The method of claim 1, further comprising:
in response to determining that the user geolocation is at the event geofence, transmitting, by the financial institution computing system to a user device associated with the user, a notification signal including information on the event.

3. The method of claim 1, wherein the user geolocation is determined from a registered geolocation of the user.

4. The method of claim 1, wherein the user geolocation is determined from a user device geolocation of a user device associated with the user, and wherein the event-based automatic transaction is initiated in response to the user device geolocation being at the event geofence.

5. The method of claim 1, further comprising:
transmitting, by the financial institution computing system to the user device, a first request for authorizing the event-based automatic transaction;
receiving, by the financial institution computing system from the user device, a first authorization message indicating whether the user has authorized the financial institution computing system to initiate the event-based automatic transaction without the user input; and
in response to the user authorizing the financial institution computing system to initiate the event-based automatic transaction without the user input, adding, by the financial institution computing system, the user in an event transaction database.

6. The method of claim 5, wherein the first request is transmitted to the user device before the probability of the event occurring.

7. The method of claim 5, further comprising:
in response to the user authorizing the financial institution computing system to initiate the event-based automatic transaction without the user input, transmitting, by the financial institution computing system to the user device, information on a plurality of products for including in the event-based automatic transaction;
receiving, by the financial institution computing system from the user device, a first transaction message indicating a set of the plurality of products selected by the user for including in the event-based automatic transaction; and
storing, by the financial institution computing system in the event transaction database, the first transaction message.

8. The method of claim 7, further comprising:
transmitting, by the financial institution computing system to the user device, a recommendation on a plurality of additional products to be included in the event-based automatic transaction;
receiving, by the financial institution computing system from the user device, a second transaction message indicating that the user authorizes inclusion of at least a set of the plurality of additional products in the event-based automatic transaction; and
in response to the second transaction message, including, by the financial institution computing system, at least the set of the plurality of additional products in the event-based automatic transaction.

9. The method of claim 5, further comprising:
in response to the user authorizing the financial institution computing system to initiate the event-based automatic transaction without the user input, transmitting, by the financial institution computing system to the user device, information on a monetary limit on the event-based automatic transaction
receiving, by the financial institution computing system from the user device, a monetary limit indicator indicating the monetary limit of the event-based automatic transaction; and
storing, by the financial institution computing system in the event transaction database, the monetary limit indicator.

10. The method of claim 5, further comprising:
in response to the user not authorizing the financial institution computing system to initiate the event-based automatic transaction without the user input, transmitting, by the financial institution computing system to the user device, a second request for authorizing the financial institution computing system to initiate the event-based automatic transaction without the user input.

11. The method of claim 10, wherein the second request is transmitted at least one of a predetermined time before the event occurs and after the event has occurred.

12. The method of claim 1, further comprising:
transmitting, by the financial institution computing system to an autonomous vehicle associated with a delivery service, the user geolocation and a delivery message to deliver a plurality of products included in the event-based automatic transaction to the user.

13. The method of claim 1, further comprising:
transmitting, by the financial institution computing system to the user device, information on at least one location from where at least one of a plurality of products included in the event-based automatic transaction can be received and additional resources can be obtained.

14. The method of claim 1, further comprising:
updating, by the financial institution computing system, the user geolocation in real time; and
transmitting, by the financial institution computing system to a first responder, the updating user geolocation.

15. The method of claim 1, wherein the probability of the occurring and the event has occurred is based on a predetermined percentage of information sources received indicating the event is going to occur or has occurred, and the event message includes at least one of the information sources.

16. The method of claim 1, wherein the external notification system comprises a news feed, a local weather service report, a global weather service report, a Doppler radar signal, an RSS feed, a TWITTER® feed, a FACEBOOK® post, an INSTAGRAM® feed, a podcast, and a user health signal.

17. The method of claim 1, wherein the event comprises at least one of a hurricane, a flood, an earthquake, a storm, a wild fire, a land slide, a terrorist attack, an active shooter situation, and a health emergency.

18. A financial institution computing system, comprising:
a network interface structured to facilitate data communication via a network;
a memory; and
a processing circuit comprising a processor, the processing circuit configured to:
receive, from an external notification system, an event message including information about an event;
determine, from the event message, and based on a plurality of information sources including a plurality of news information sources independent of a particular physical location, a probability of the event occurring, the probability being based on a predetermined percentage of news information sources indicating that the event is going to occur or is occurring;

in response to the probability of event occurring satisfying a predetermined threshold corresponding to the predetermined percentage, determine an event geofence including a plurality of geolocations impacted by the event;

determine a user geolocation of the user;

determine an authorized financial account associated with the user and provided by the financial institution computing system; and in response to determining that the user geolocation is at the event geofence, initiate an event-based automatic transaction with a mobile banking client application linked to the authorized financial account without user input on behalf of the user, update the user geolocation in real time, and transmit a notification including the updating user geolocation to a first responder, wherein the event message includes at least one of the information sources.

19. The financial institution computing system of claim 18, wherein the processing circuit determines the user geolocation from a user device geolocation of the user device, and wherein the event-based transaction is authorized in response to determine that the user device geolocation is at the event geofence.

20. The financial institution computing system of claim 18, wherein the processing circuit is further configured to:

transmit to the user device before probability of the event occurring, a first request for authorizing the event-based automatic transaction;

receive from the user device, a first authorization message indicating that the user has authorized the financial institution computing system to initiate the event-based automatic transaction on behalf of the user without the user input; and in response to the user authorizing the financial institution computing system to initiate the event-based automatic transaction without the user input, add the user to an event transaction database.

21. The financial institution computing system of claim 20, wherein the processing circuit is further configured to:

in response to the user authorizing the financial institution computing system to initiate the event-based automatic transaction without the user input, transmit information on a plurality of products to be included in the event-based automatic transaction to the user device;

receive a first transaction message from the user device indicating a set of the plurality of products selected by the user for including in the event-based automatic transaction; and store the first transaction message in the event transaction database.

22. The financial institution computing system of claim 21, wherein the processing circuit is further configured to:

transmit a recommendation on a plurality of additional products to be included in the event-based automatic transaction;

receive a second transaction message from the user device indicating that the user authorizes inclusion of at least a set of the plurality of additional products in the event-based automatic transaction; and in response to the second transaction message, include at least the set of the plurality of additional products in the event transaction database.

23. The financial institution computing system of claim 20, wherein the processing circuit is further configured to:

in response to the user authorizing the financial institution computing system to initiate the event-based automatic transaction without the user input, transmit information on a monetary limit of the event-based automatic transaction to the user device;

receive a monetary limit indicator from the user device indicating a monetary limit of the event-based automatic transaction; and store the monetary limit indicator in the event transaction database.

24. The financial institution computing system of claim 18, wherein the processing circuit is further configured to:

transmit a delivery message to a delivery service instructing an autonomous vehicle associated with the delivery service to deliver a plurality of products included in the event-based automatic transaction to the user.

25. The financial institution computing system of claim 18, wherein the processing circuit is further configured to:

transmit information on at least one location where at least one of a plurality of products included in the event-based automatic transaction can be received and additional resources can be obtained.

26. A non-transitory processor-readable medium having processor-readable instructions stored thereon, such that when executed by a processor of a financial institution computing system, cause the financial institution computing system to perform operations, the operations comprising:

receive, from an external notification system, an event message including information about an event;

determine, from the event message, and based on a plurality of information sources including a plurality of news information sources independent of a particular physical location, a probability of the event occurring, the probability being based on a predetermined percentage of news information sources indicating that the event is going to occur or is occurring;

in response the probability of event occurring satisfying a predetermined threshold corresponding to the predetermined percentage, determine an event geofence including a plurality of geolocations impacted by the event;

determine a user geolocation of the user;

determine, by the financial institution computing system, an authorized financial account associated with the user and provided by the financial institution computing system; and in response to the user geolocation being at the event geolocation, initiate an event-based automatic transaction with a financial account associated with the user and provided by the financial institution computing system, without user input on behalf of the user, update the user geolocation in real time, and transmit a notification including the updating user geolocation to a first responder, wherein the event message includes at least one of the information sources.

27. A method of making an event-based automatic transaction on behalf of a user, the method comprising:

sending, from a financial institution computing system to a user device associated with the user, a request message for enrolling in an event-based automatic transaction program before an event has occurred;

receiving, by the user device, the request message;

in response to the user enrolling in the event-based automatic transaction program, adding, by the financial institution computing system to an event transaction database, information about the user;

determining, by the financial institution computing system, and based on a plurality of information sources including a plurality of news information sources independent of a particular physical location, whether the event is about to occur based on a probability satisfying a predetermined threshold corresponding to a predetermined percentage of news information sources indicating that the event is going to occur or is occurring;

in response to the determining that the event is about to occur, determining, by the financial institution computing system, an event geolocation impacted by the event;

determining, by the financial institution computing system, a user geolocation of the user;

determining, by the financial institution computing system, whether the user geolocation is at the event geolocation;

in response to the user geolocation being at the event geolocation and the user having enrolled in the event-based transaction program, initiating, by the financial institution computing system without user input, the event-based automatic transaction on behalf of the user.

28. The method of claim 27, further comprising:

in response to the user geolocation being at the event geolocation and the user having enrolled in the event-based automatic transaction program, sending, by the financial institution computing system to the user device, a notification that the event-based automatic transaction will be made.

29. The method of claim 27, further comprising:

in response to the user geolocation being at the event geolocation and the user not having enrolled in the event-based transaction program, sending, by the financial institution computing system to the user device, a second request message notifying the user of the event and providing the option to enroll in the event-based automatic transaction program; and in response to the user enrolling in the event-based transaction program, initiating, by the financial institution computing system without the user input, the event-based automatic transaction on behalf of the user.

30. A method of making an event-based automatic transaction on behalf of a user, the method comprising:

receiving, by a financial institution computing system from an external notification system, an event message including information about an event;

determining, by the financial institution computing system from the event message, and based on a plurality of information sources including a plurality of news information sources independent of a particular physical location, a probability of the event occurring, the probability being based on a predetermined percentage of news information sources indicating that the event is going to occur or is occurring;

in response to the probability of the event satisfying a predetermined threshold corresponding to the predetermined percentage, determining, by the financial institution computing system from the event message, an event geofence including a plurality of geolocations impacted by an event;

determining, by the financial institution computing system and based on a user device geolocation received from a user device of the user, that the user is at the event geofence; and in response to determining that the user is at the event geolocation, by the financial institution computing system, automatically initiating and processing the event-based automatic transaction with a financial account associated with the user and provided by the financial institution computing system, to digitally purchase goods or services on behalf of the user by automatic payment through a mobile wallet client application linked to the financial account, updating the user geolocation in real time, and automatically transmitting a notification including the updating user geolocation to a first responder, wherein the event message includes at least one of the information sources.

* * * * *